United States Patent [19]

Poleschuk et al.

[11] Patent Number: 5,575,177
[45] Date of Patent: Nov. 19, 1996

[54] TURN SIGNAL CANCELLATION MECHANISM

[75] Inventors: LeRoy A. Poleschuk, White Lake; James B. Wright, Warren; Dale R. Jesselson, Livonia, all of Mich.

[73] Assignee: United Technologies Automotive, Inc., Dearborn, Mich.

[21] Appl. No.: 380,090

[22] Filed: Jan. 30, 1995

Related U.S. Application Data

[63] Continuation-in-part of Ser. No. 120,676, Sep. 13, 1993, Pat. No. 5,385,067.

[51] Int. Cl.$^6$ .............................. H01H 3/16; H01H 19/04
[52] U.S. Cl. .................. 74/484 R; 200/61.3; 200/61.35; 200/280; 200/292; 200/303
[58] Field of Search ........................ 74/484 R; 200/61.3, 200/61.35, 280, 292, 303

[56] References Cited

U.S. PATENT DOCUMENTS

| | | | |
|---|---|---|---|
| 3,849,613 | 11/1974 | Kawai | 200/61.27 |
| 3,914,566 | 10/1975 | Wendling | 200/61.27 |
| 4,123,632 | 10/1978 | Muto | 200/61.27 |
| 4,426,951 | 1/1984 | Nishizima | 200/61.54 |
| 4,503,296 | 3/1985 | Iwata et al. | 200/61.27 |
| 4,590,341 | 5/1986 | Iwata et al. | 200/61.54 |
| 4,647,736 | 3/1987 | Furuhashi et al. | 200/61.27 |
| 4,739,131 | 4/1988 | Maeda | 200/61.27 |
| 4,840,078 | 6/1989 | Shitanoki | 74/484 R |
| 4,888,456 | 12/1989 | Suzuki | 200/61.27 |
| 4,900,946 | 2/1990 | Williams et al. | 200/61.54 X |
| 5,030,802 | 7/1991 | Noro | 200/61.27 |
| 5,196,662 | 3/1993 | Hofmann | 200/61.54 |
| 5,200,584 | 4/1993 | Nagaya | 200/61.54 X |
| 5,216,399 | 6/1993 | Kamada et al. | 200/61.27 X |
| 5,313,028 | 5/1994 | DuRocher | 200/61.27 |
| 5,385,067 | 1/1995 | Wiersing et al. | 74/484 R |

FOREIGN PATENT DOCUMENTS

| | | |
|---|---|---|
| 1345468 | 10/1963 | France. |
| 2246171 | 4/1975 | France. |
| 2262474 | 9/1975 | France. |
| 3146271 | 6/1983 | Germany. |
| 9212458.5 | 3/1993 | Germany. |

*Primary Examiner*—Allan D. Herrmann
*Attorney, Agent, or Firm*—Harness, Dickey & Pierce, P.L.C.

[57] ABSTRACT

A turn signal cancellation mechanism has an actuator and a pawl engagably interfacing therewith. In one aspect of the present invention, the pawl is disposed on an opposite side of a steering shaft from a handle interfacing segment of the actuator. In another aspect of the present invention, a unique pawl movably engages with a modified T-shaped slot within an actuator. A further aspect of the present invention provides a modularized system wherein a common housing interchangeably retains differing circuit boards, pivoting actuators coupled to handles, and various switches, depending on the specific options desired. In still another aspect of the present invention, a detent plunger has a shaft with a quadrilateral cross sectional shape along a portion thereof and an integrally formed semi-spherical cap. An improved fastening means is also employed to attach the present invention turn signal cancellation mechanism onto the steering column.

50 Claims, 9 Drawing Sheets

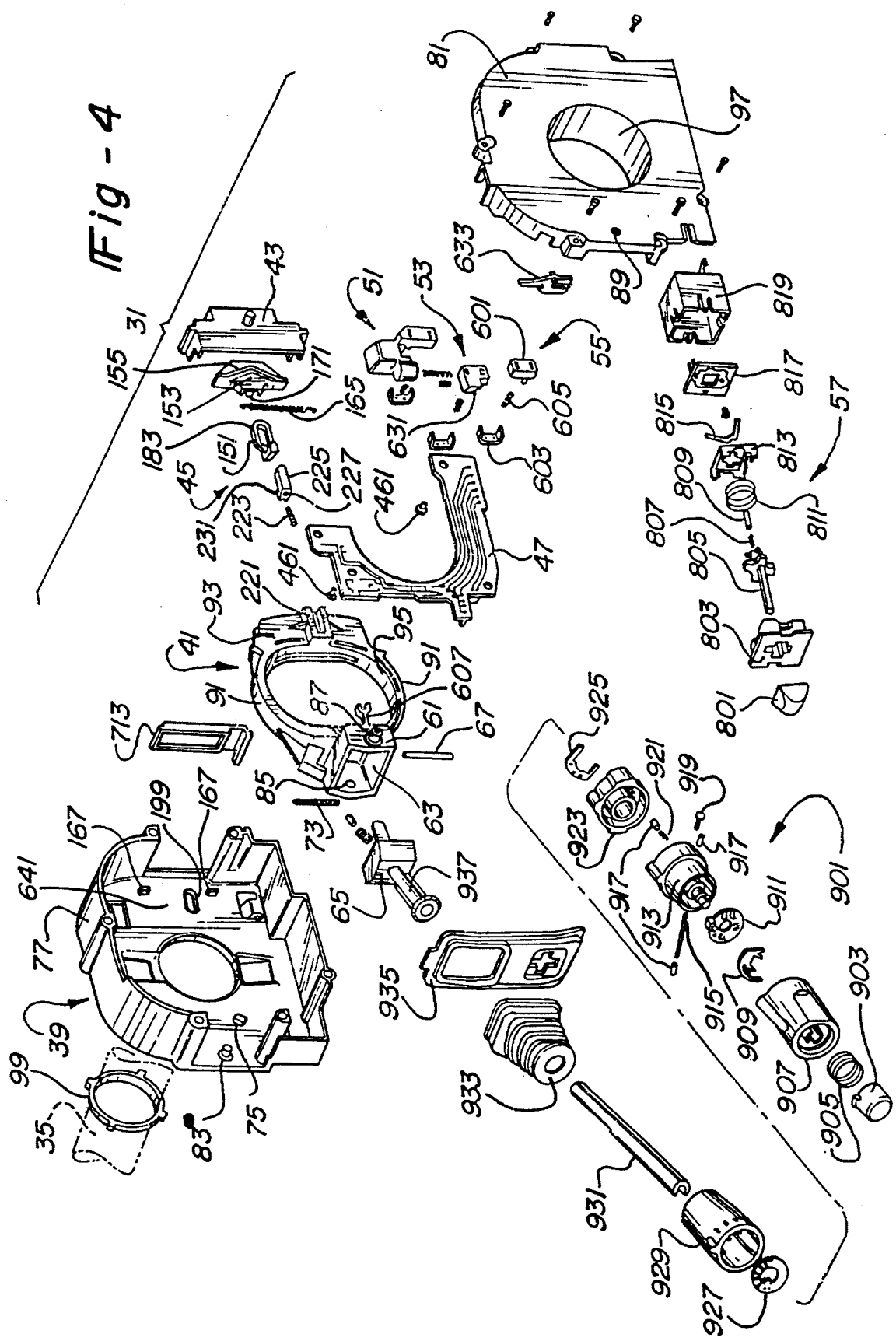

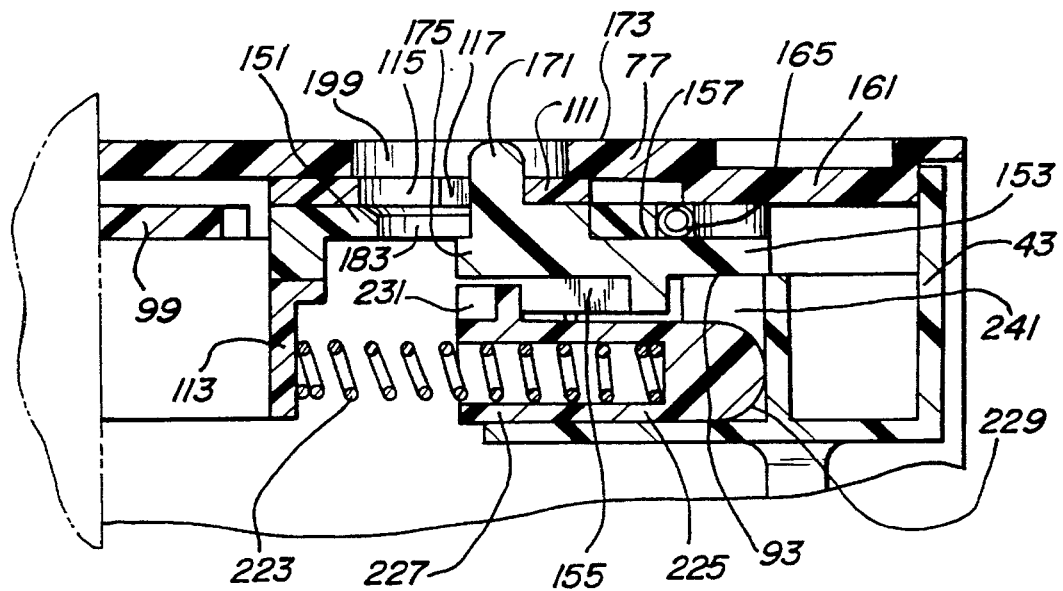
Fig-6
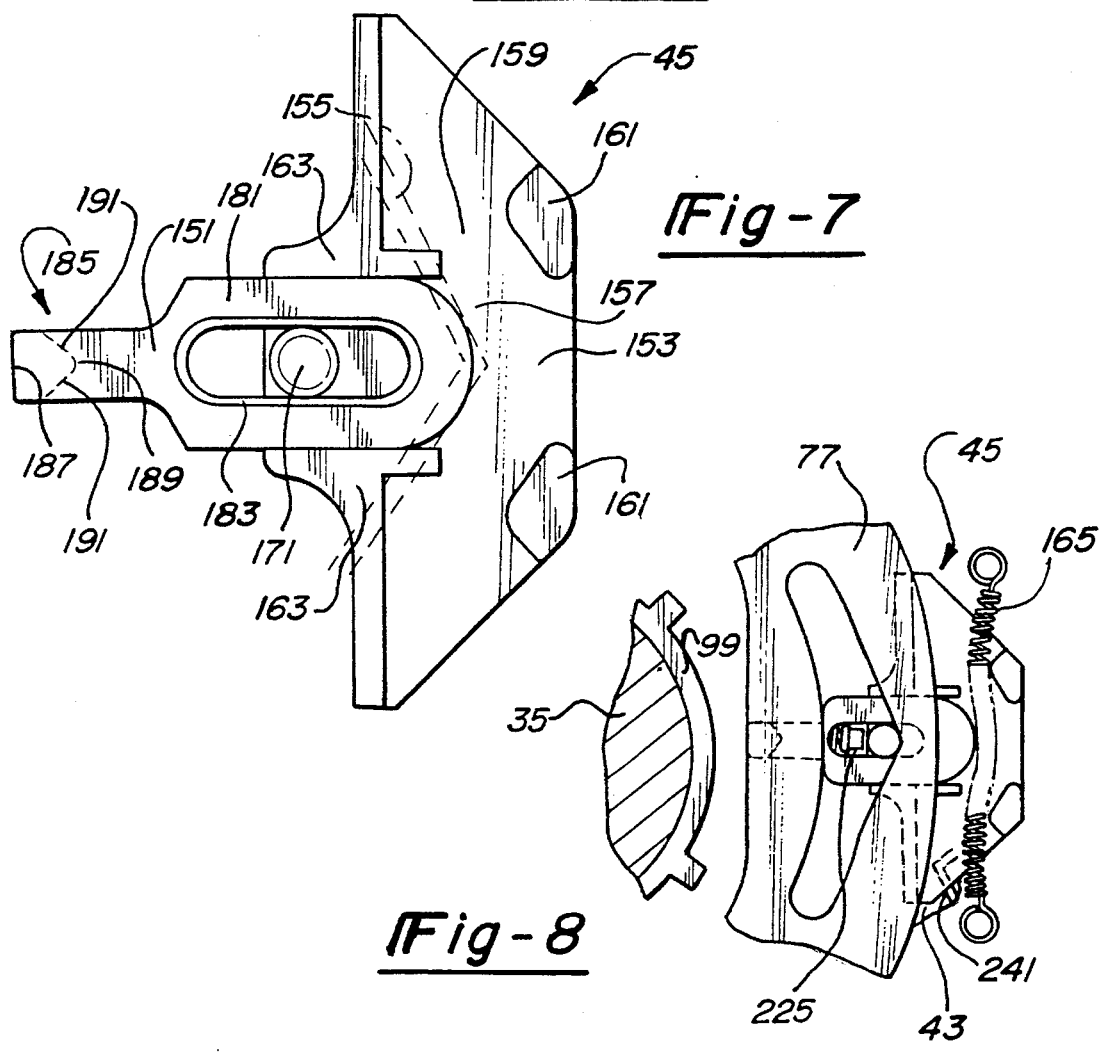
Fig-7
Fig-8

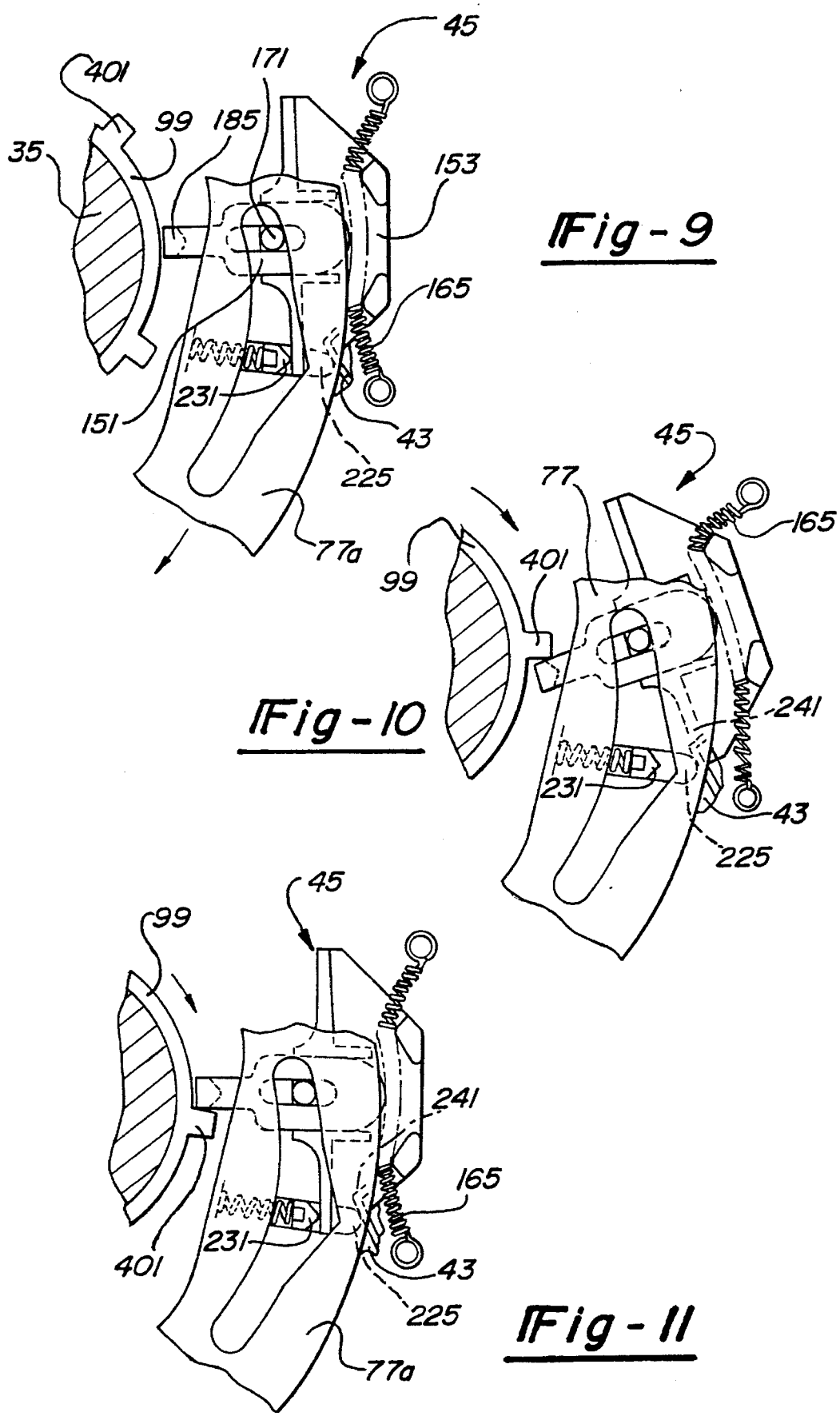

TURN SIGNAL CANCELLATION MECHANISM

CROSS REFERENCE TO RELATED APPLICATION

This is a continuation-in-part of a patent application Ser. No. 08/120,676, which was filed on Sep. 13, 1993 and will issue as U.S. Pat. No. 5,385,067.

BACKGROUND OF THE INVENTION

This invention relates generally to turn signal cancellation mechanisms and components thereof for use in automotive vehicles.

In most automotive vehicles, it is common to have a turn signal cancellation mechanism which contains electrical switching components and functionally interfaces with a steering shaft assembly. Virtually all such mechanisms have a housing or casing upon which a handle is pivotably mounted. This housing is radially disposed adjacent to half or surrounds the entire steering shaft assembly such that various internal members can engage a cancel cam of the steering shaft assembly. When a turn is to be made, the handle is pivoted in the direction of turning and an internal ball is then engaged into a detented position where it remains latched until after the turn has been completed. After the turn has been completed, the switch is canceled or turned off and the handle is allowed to return to its original neutral position. Additionally, a variety of other electrical accessories, such as hazard lamp switches and windshield wiper switches, may be incorporated within the turn signal handle and housing.

There are many traditional constructions for these turn signal cancellation mechanisms and switches. One such device is configured from a pivoting handle and actuator which work in conjunction with a pawl and extension spring. The actuator has a pair of outwardly extending arms generally forming a semi-circle upon which the pawl is mounted to span therebetween. Furthermore, a spring loaded detent finger is affixed upon an end of each arm of the actuator for engagement with an adjacent one of a pair of detent formations formed within the outer housing. Moreover, the pawl has two enlarged half-moon-shaped wings projecting outwardly from a central cavity within which is a spring loaded plunger. Each wing is pivotably movable by engagement with an adjacent arm of the actuator. The extension spring engages the pawl central cavity proximate with the exposed portion of the plunger. Moreover, a cylindrical post projects from the central cavity of the pawl perpendicular to a plane defined by the wings and engages an adjacent portion of the casing. The post guides the linear movement of the pawl in relation to the casing. While this construction is an improvement in the art, it is large to package and requires a multitude of components, thus, necessitating extraneous assembly operations and additional cost.

Other conventional constructions are disclosed in the following U.S. Pat. No. : 5,030,802 entitled "Turn Signal Apparatus" which issued to Noro on Jul. 9, 1991; U.S. Pat. No. 4,900,946 entitled "Multi-Function Switch for Automotive Vehicles," which issued to Williams et al. on Feb. 13, 1990; U.S. Pat. No. 4,840,078 entitled "Steering Device for Vehicles," which issued to Shitanoki on Jun. 20, 1989; U.S. Pat. No. 4,426,951 entitled "Turn Signal Cancellation Apparatus for Use with Steering Wheel and Shaft Assembly," which issued to Nishizima on Jan. 24, 1984; U.S. Pat. No. 4,123,632 entitled "Turn Signal Mechanism for Use in Motor Vehicles" which issued to Muto on Oct. 31, 1978; and, U.S. Pat. No. 3,914,566 entitled "Turn Signal and Hazard Warning Switch," which issued to Wendling on Oct. 21, 1975, all of which are incorporated by reference herewithin. In general, most traditional turn signal cancellation mechanisms are difficult to actuate while the vehicle is engaged in a gentle turn in a first direction when the vehicle operator desires to make a sharp turn in a second and opposite direction. These mechanisms will usually be prematurely canceled by the turned steering shaft assembly and prevent the desired pivoted and detented actuation of the device. Furthermore, most conventional turn signal cancellation mechanisms have sloppy handle pivoting activation, feel and sound due to the many part tolerance buildups, molding marks on detent surfaces and small pivoting geometry.

Accordingly, a turn signal cancellation mechanism is desired which is compactly packaged, contains fewer parts, can be cost effectively produced and assembled, and which has reduced play or sloppy activation.

SUMMARY OF THE INVENTION

In accordance with the present invention, a preferred embodiment of a turn signal cancellation mechanism has an actuator and a pawl engagably interfacing therewith. In one aspect of the present invention, the pawl is disposed on an opposite side of a steering shaft from a handle interfacing segment of the actuator. In another aspect of the present invention, a unique pawl movably engages with a modified T-shaped slot within an actuator. A further aspect of the present invention provides a modularized system wherein a common housing interchangeably retains differing circuit boards, pivoting actuators coupled to handles, and various switches, depending on the specific options desired. In still another aspect of the present invention, a detent plunger has a shaft with a quadrilateral cross sectional shape along a portion thereof and an integrally formed semi-spherical cap. An improved fastening means is also employed to attach the present invention turn signal cancellation mechanism onto the steering column.

The turn signal cancellation mechanism of the present invention is advantageous over traditional constructions in that the pivoting geometry of the present invention causes significant pivotal movement of an actuator, where a detent plunger is located, in response to relatively modest pivoting movement at a handle interfacing segment of the actuator. This achieves reduced handle play, improved detented turn position feel and a less harsh operating sound. Furthermore, the improved pivoting geometry further prevents a vehicle operator from feeling the effects of mold parting lines and sink marks upon a detent structure. The pivoting geometry used in the present invention allows for easier fine tuning of component part interactions and the associated vehicle driver feel. The spring efforts required to operate the cancel return and pawl moving functions are also reduced.

The present invention turn signal cancellation mechanism is also advantageous by providing a common housing for retaining interchangeable component parts for differing switch features. Thus, piece cost, assembly cost, tooling cost, assembly complexity, redesign and repackaging are all significantly reduced based on this modular construction. This modularization is further achieved through use of a circuit board within the housing for interfacing with one or more electrical switches. The circuit board can also be centrally located within the housing for switch access along both faces thereof. This also allows for easier packaging of actuators and electrical connectors. Moreover, the turn signal cancellation mechanism of the present invention is advantageous over conventional devices by providing quick and inexpensive assembly of the turn signal cancellation mechanism upon the adjacent steering column in a screw-free operation. Additional advantages and features of the present invention will become apparent from the following description and appended claims, taken in conjunction with the accompanying drawings.

BRIEF DESCRIPTION OF THE DRAWINGS

FIG. 4 is an exploded perspective view showing the component parts of the preferred embodiment turn signal cancellation mechanism of the present invention;

FIG. 6 is an enlarged cross sectional view, taken along line 6—6 of FIG. 5, showing the preferred embodiment turn signal cancellation mechanism of the present invention;

FIG. 7 is an enlarged true elevational view showing the preferred embodiment pawl of the present invention turn signal cancellation mechanism;

FIGS. 8–14 are fragmentary elevational views, similar to that of FIG. 5, showing a series of operational positions of the preferred embodiment turn signal cancellation mechanism of the present invention;

DETAILED DESCRIPTION OF THE PREFERRED EMBODIMENT

Figure 1:
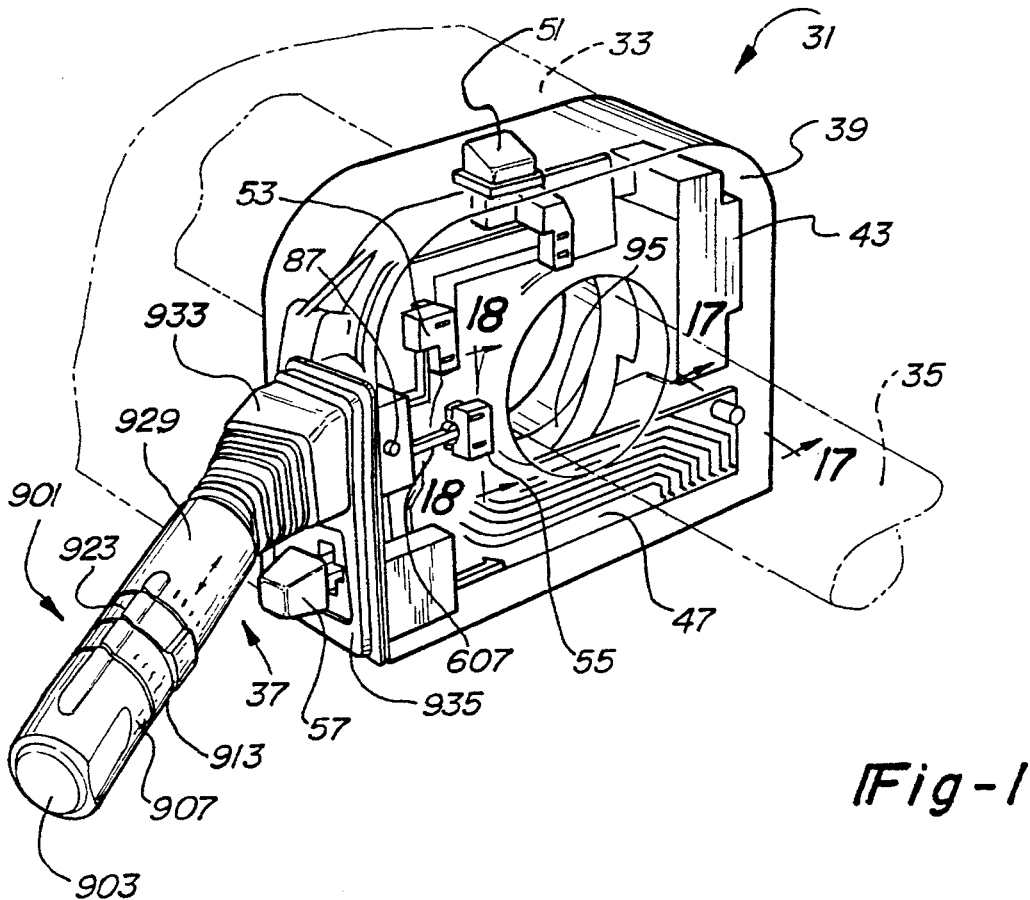
FIG. 1 is a perspective view as seen from the rear of an automotive vehicle, showing the preferred embodiment turn signal cancellation mechanism of the present invention.
Figure 2:
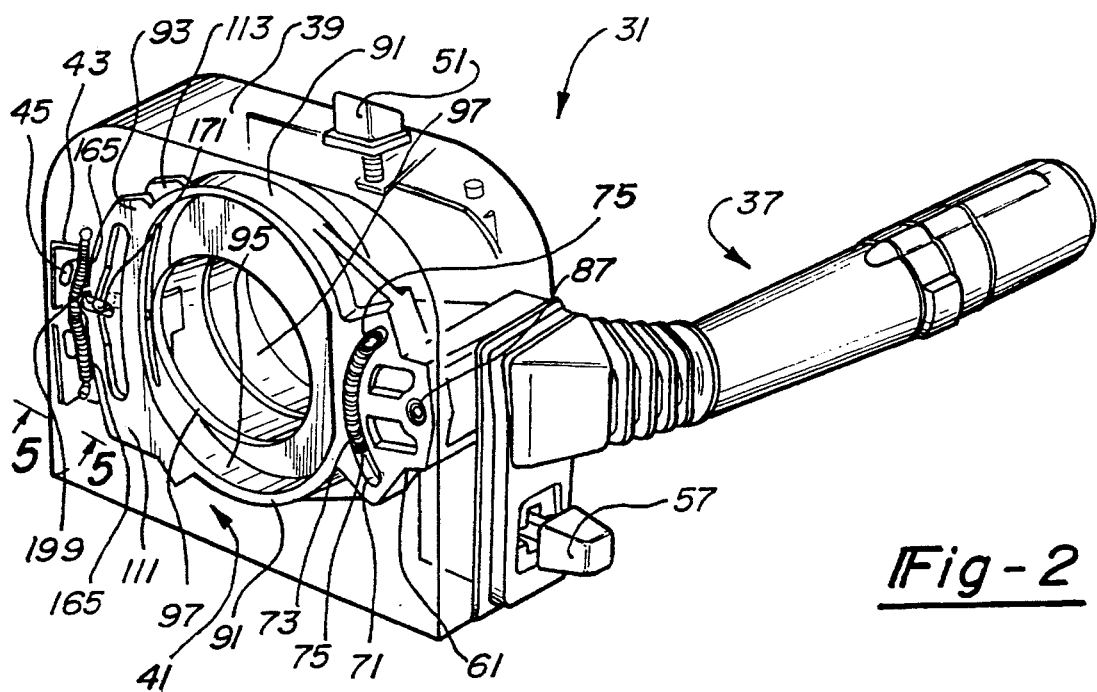
FIG. 2 is a perspective view, opposite that of FIG. 1, showing the preferred embodiment turn signal cancellation mechanism of the present invention illustrated in a neutral position.

Referring to FIGS. 1 and 2, the preferred embodiment of a turn signal cancellation mechanism 31 of the present invention fits upon a steering column 33 of an automotive vehicle with a conventional steering shaft 35 rotatably extending through a central part thereof. Turn signal cancellation mechanism 31 preferably has a stalk or handle 37, a housing 39, an actuator 41, a detent structure 43, a pawl 45 and a circuit board 47. A hazard switch 51, headlight dimmer switch 53, turn signal switch 55 and steering column tilt switch 57 are also provided within turn signal cancellation mechanism 31.

Figure 3:
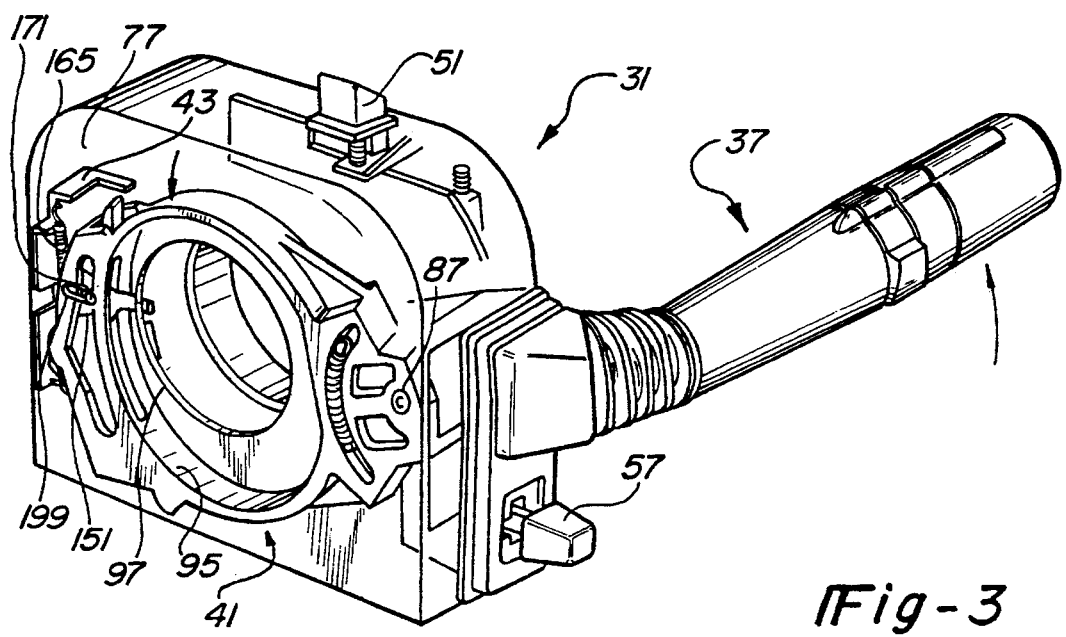
FIG. 3 is a perspective view, similar to that of FIG. 2, showing the preferred embodiment turn signal cancellation mechanism of the present invention, illustrated in a right turn position.
Figure 5:
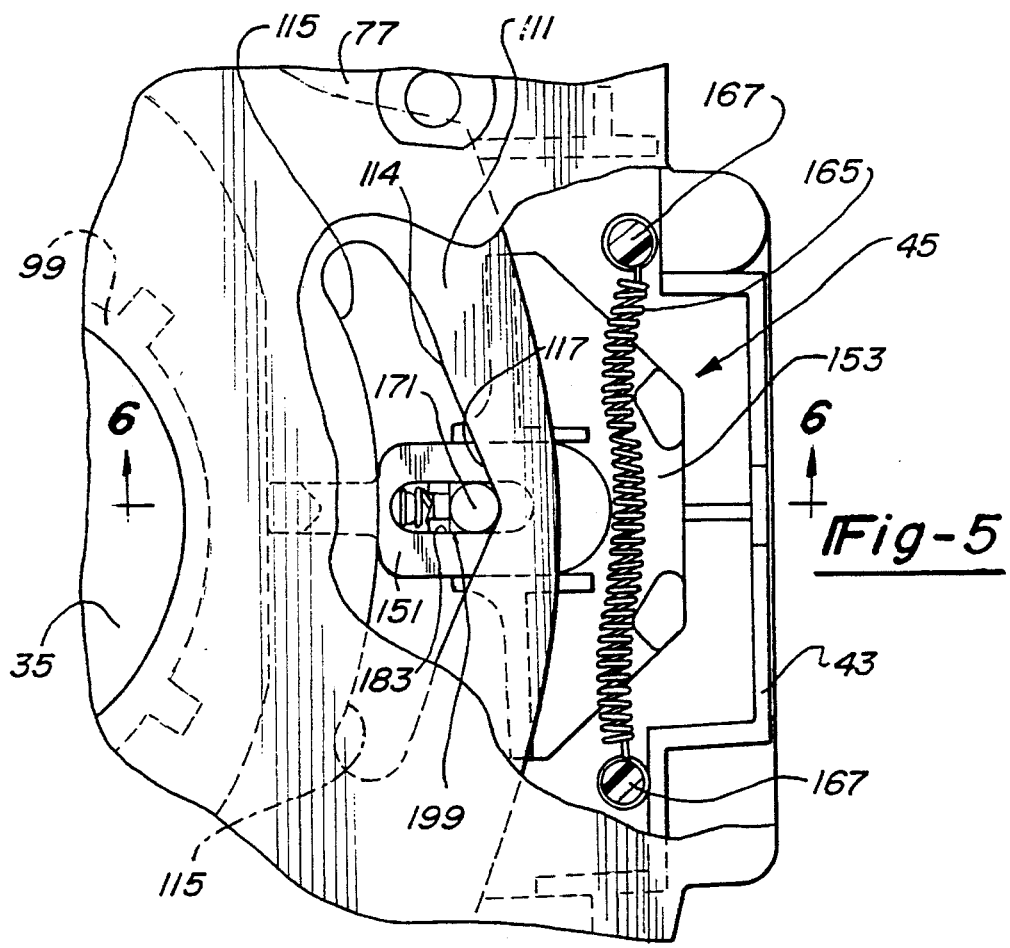
FIG. 5 is an enlarged and fragmentary elevational view, taken in the direction of arrow 5 from FIG. 2, showing the preferred embodiment turn signal cancellation mechanism or, the present invention.
Figure 15:
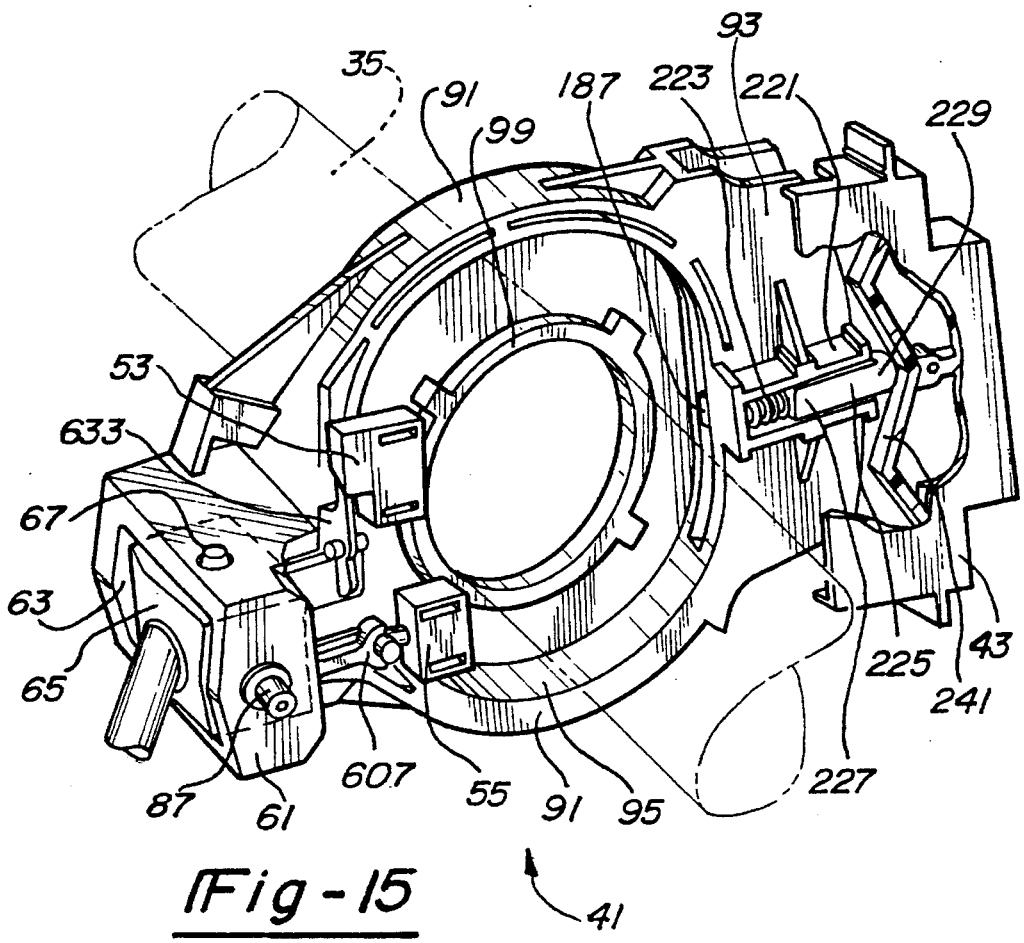
FIG. 15 is a perspective view, similar to that of FIG. 1 with portions broken away therefrom, showing the preferred embodiment turn signal cancellation mechanism of the present invention.

Actuator 41 is best illustrated in FIGS. 2, 4 and 15. Actuator 41 includes a handle interfacing segment 61 having a receptacle 63 within which a handle hub 65 is pivotally mounted by a roll pin 67. An arcuate channel 71 is further disposed within handle interfacing segment 61 for guiding a tension spring 73. A pair of projections 75 of a body portion 77 of housing 39 extend within channel 71 adjacent to the outboard ends of spring 73. An enlarged area is centrally disposed within channel 71 for compressing the ends of spring 73 against projections 75 during turning movement of handle 37 and actuator 41. This construction provides biasing means for centering actuator 41 in its nominal neutral position. Handle interfacing segment 61 is pivotally trapped between body 77 and a cover portion 81 of housing 39 such that a pedestal 83 extending from body 77 engages with a hole 85 in handle interfacing segment 61. Coaxial therewith, a pintle 87 projects from handle interfacing segment 61 for pivoting engagement with a hole 89 in cover 81. Thus, downward movement of handle 37 causes actuator to pivot to a left turn position. Oppositely, upward movement of handle 37 causes actuator 41 to downwardly pivot into a right turn position as is shown in FIG. 3. The neutral and unturned position is illustrated in FIGS. 2 and 15.

Referring again to FIGS. 4 and 15, actuator 41 further includes a pair of semi-circular extension segments 91 which join an engagement segment to handle interfacing segment 61. An inside surface 95 defined by extension segments 91, handle interfacing segment 61 and engagement segment 93, has an elongated annular shape substantially coaxial with a passageway 97 disposed through housing 39. A cancel cam 99 and steering shaft 35 rotatably extend through passageway 97 and inside surface 95 of actuator 41. Cancel cam 99 is preferably mounted upon a portion of a clock spring assembly that moves in conjunction with steering shaft 35. However, cancel cam 99 may alternately be attached directly upon steering shaft 35.

FIGS. 2 and 5 through 7 show pawl 45 and engagement segment 93 in greater detail. Engagement segment 93 of actuator 41 is defined by an engagement wall 111 and a plunger wall 113 which are located substantially parallel to each other with an opening in inside surface 95 therebetween. Engagement wall 111 has a slot 114 formed therein having a modified T-shape defined by a pair of upper channels 115 with an obtusely angled V-shaped leg 117 centrally connected thereto. The V-shaped leg 117 has an approximately 130 degree angle between surfaces thereof. These surfaces are joined to upper channels 115 by approximately 5.5 millimeter radii. Furthermore, the arcuate surface closest to steering shaft 35, defined by upper channels 115, has an approximately 94.5 millimeter radius as measured from the centerline of hole 85 (see FIG. 4). Actuator 41 is preferably injection molded from a 33 percent glass reinforced Nylon 6/6 material such as DuPont ZYTEL®.

The presently preferred construction of pawl 45 has an arm 151 which is a separate piece from a base 153. Base 153 has a V-shaped support 155 on a rearward surface and a flat shelf 157 on the opposite surface. A transverse channel 159 is disposed between a pair of subshafts 161 and a pair of guides 163 along shelf 157. An extension spring 165 runs through channel 159 and has its ends mounted upon L-shaped tabs 167 projecting from body 77. A post 171 upwardly extends from base 153 between guides 163. Post 171 has a cylindrical section integrally mounted upon a stepped section 173 located closest to a nominal section 175 of the arm.

Arm 151 is defined by a yoke 181 having an elongated slot 183 disposed therein through which post 171 protrudes. Yoke 181 is further transversely trapped between guides 163 but can move in a longitudinally linear manner in relation to base 153 upon compressing a center portion of extension spring 165. Arm 1 51 further has a thickened cancel cam interfacing section 185 defined by a flat head 187 and a tapered foot 189 formed by a pair of angled lateral faces 191 pointing toward post 171. Both arm 151 and base 153 of pawl 45 are preferably injection molded from an acetal resin such as DuPont DELRIN® 500 NC-10. The cylindrical portion of post 171 further engages with an elongated slot 199 molded within body 77. Alternately, the head of arm 1 51 may also have a tapered configuration thereto. Furthermore, the entire cancel cam interfacing section may be entirely flush with the nominal arm surface. In another alternate design, the arm may be integrally formed with the base.

A plunger support structure 221 is mounted upon plunger wall 93, as is illustrated in FIGS. 4, 6 and 15. A compression spring 223 linearly biases a plunger 225 outward from plunger support structure 221. Plunger 225 is constructed from a square shaft 227 with a partially spherical cap 229 integrally injection molded therewith. Shaft 227 is hollow for accepting a portion of spring 223. A finger 231 upwardly extends from shaft 227 for selective engagement with V-shaped support 155 of base 153. Plunger 225 selectively rides along a ledge 241 of detent structure 43 thereby providing a left turn, neutral (FIG. 15) and right turn detent positions coincidental with valleys formed along ledge 241. The substantially square cross sectional shape of the nominal portion of shaft 227 allows for easy and cost effective adjustment or tuning of plunger 225 within plunger support structure 221. In other words, by adding a little material to a side of shaft 227, undesired rotation or play of plunger 225 within plunger support structure 221 is reduced or eliminated. The square shape of shaft 227 also allows plunger 225 to be trapped in place between a rearward wall of detent structure 43 and actuator 41. Furthermore, by placing plunger 225 on the opposite side of steering shaft 35 from handle interfacing segment 61, the geometrically increased pivoting of plunger 225 in relation to detent structure 43 provides for more gradual detent actions, smoother feel and a less harsh sound. Plunger 225 is preferably injection molded from molybdenum disulfide filled nylon 6/6, nylatron grade GS.

The operational steps of pawl 45 and plunger 225, in relation to engagement surface 77a and cancel cam 99, are shown in FIGS. 8–14. FIG. 8 illustrates engagement surface 77a and pawl 45 in their neutral and unturned positions. FIG. 9 shows engagement surface 77a moved to its right turn position. Accordingly, post 1 71 inwardly rides along the V-shaped leg until it is positioned adjacent an end of the upper channel. This movement causes pawl 45 to inwardly move toward steering shaft 35 and cancel cam 99. Simultaneously, plunger 225 rides over a peak in detent structure 43 thereby assuming a detented right turn position. Although not shown, this right turn detented position can be achieved even if a lobe 401 of cancel cam 99 is in line with cancel cam interfacing section 185 of pawl 45. In that scenario, arm 151 is unmoved while base 153 is inwardly moved.

Figure 12:
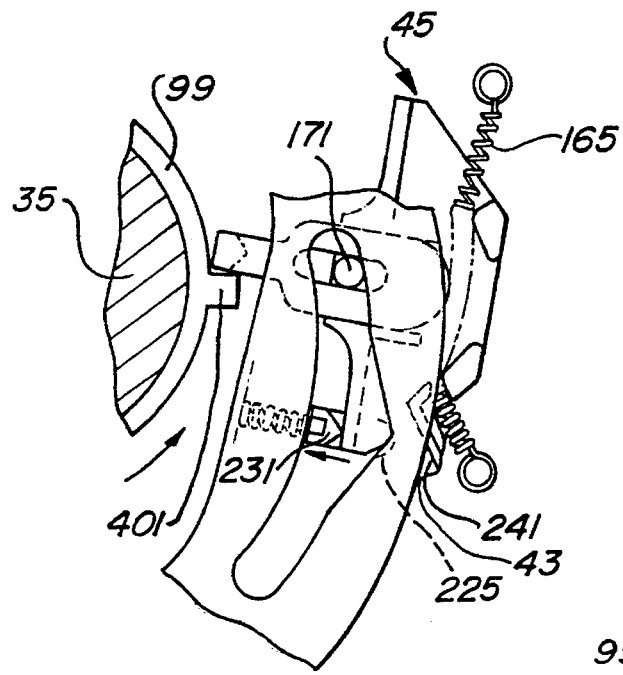
Figure 13:
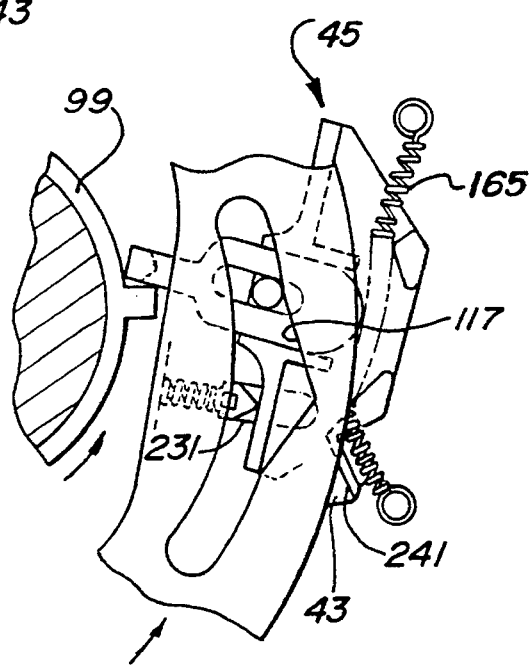
Figure 14:
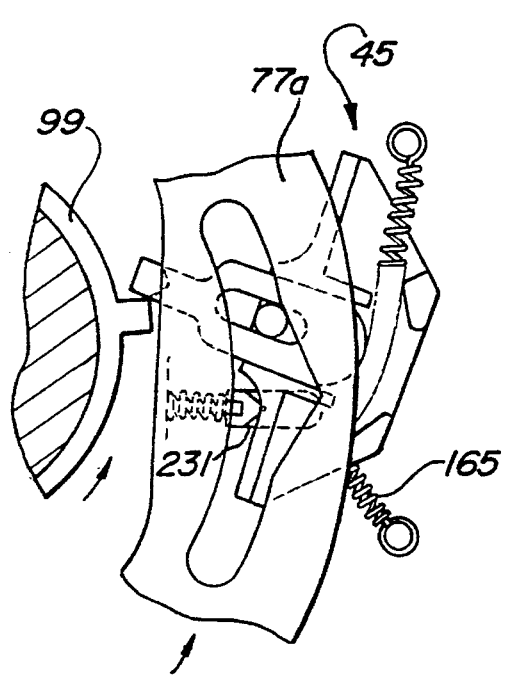

FIGS. 10 and 11 demonstrate how pawl 45 and engagement surface 77a of the actuator are maintained in their turned positions even when a vehicle operator makes the right turn. Lobe 401 of cancel cam 99 merely acts to deflect pawl 45 but does not release plunger 225 from its right turn detented position. However, as is illustrated in FIGS. 12–14, after the vehicle operator has made the right turn, the steering shaft 35 and cancel cam 99 are rotated back toward a straightened position. Accordingly, lobe 401 on cancel cam 99 pushes pawl 45 such that V-shaped support 155 (see FIG. 6) retracts plunger 225 from its right turn position. Post 171 then is pulled toward V-shaped leg 117 by spring 165 while pawl 45 moves outwardly away from cancel cam 99. Thus, engagement surface 77a of actuator 41 (see FIG. 15) and the associated turn signal switch 55 are moved back toward their neutral positions.

Figure 16:
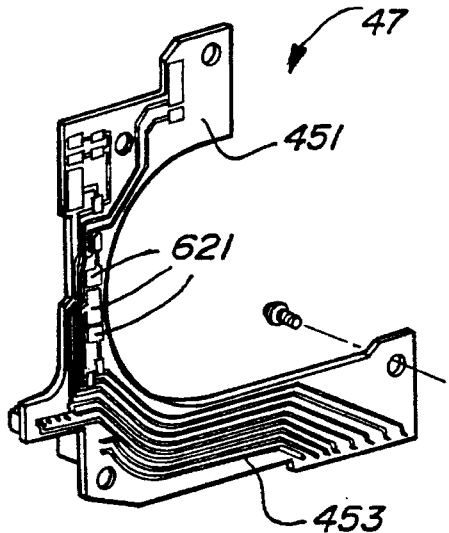
FIG. 16 is a perspective view, as seen from the rear of the vehicle, showing the preferred embodiment circuit board of the present invention turn signal cancellation mechanism.
Figure 17:
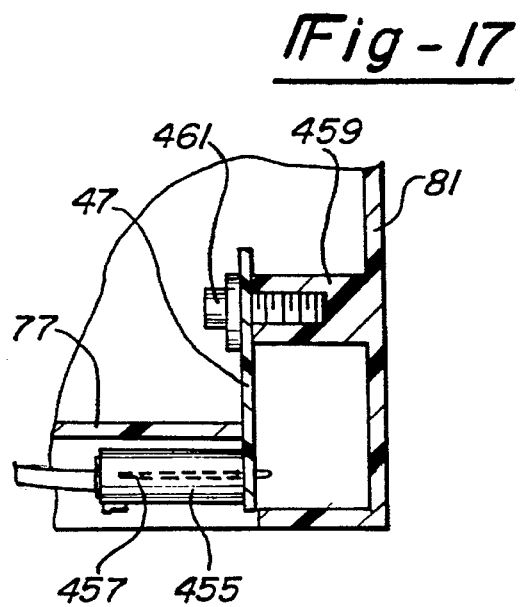
FIG. 17 is a cross sectional view, taken along line 17—17 of FIG. 1, showing the preferred embodiment turn signal cancellation mechanism of the present invention.
Figure 18:
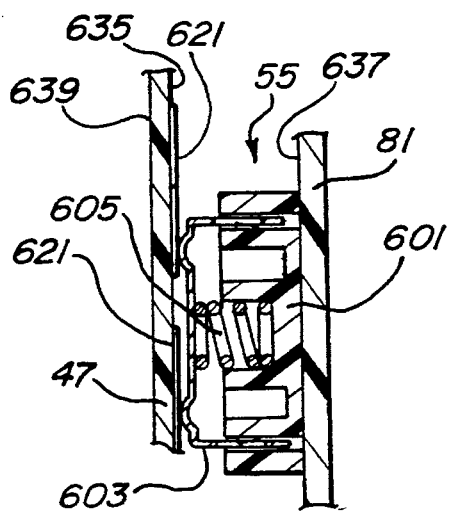
FIG. 18 is a cross sectional view, taken along line 18—18 of FIG. 1, showing the preferred embodiment turn signal cancellation mechanism of the present invention.

Circuit board 47 includes a rigid substrate 451 upon which is printed a plurality of electric current carrying paths 453. This is best shown in FIGS. 16 and 17. A polymeric electrical connector 455 is affixed to circuit board 47 such that a plurality of stamped metallic terminals 457 are soldered onto paths 453. Substrate 451 is screwed onto a plurality of bosses 459 projecting from cover 81 by screws 461. Cover 81 and body 77 are preferably injection molded from 14 percent glass reinforced nylon 6 such as CAPRON® from Allied Signal. Alternately, the preferred rigid printed circuit board 47 can be replaced by a supported flexible mylar film with circuits printed thereon, deposited conductive ink, metal frets or stampings, or the like. It must also be appreciated that the rigid printed circuit board can be retained to the housing within grooves or by snap fits instead of screws.

Referring to FIGS. 1, 4, 15 and 18, turn signal switch 55 includes a polymeric carrier 601 and a stamped, copper alloy contactor 603 with a compression spring 605 therebetween. Carrier 601 is movably coupled to a forcated lever 607 which is attached to and pivots with handle interfacing segment 61 of actuator 41. Contactor 603 slides between three circuit board contact pads 621 (see FIG. 16). Thus, turn signal switch 55 energizes or deenergizes the appropriate left or right turn lamps in response to pivoting movement of handle 37.

Dimmer switch 53 and hazard switch 51 are constructed in substantially the same manner as that disclosed with regard to turn signal switch 55. However, referring to FIGS. 4 and 15, the carrier of dimmer switch 53 has a wedge 631 molded thereon which is moved up and down by an actuator operated cam 633. Hazard switch 51 is directly depressed into housing 39 by the vehicle driver. The contactors of all these switches ride directly against contact pads of circuit board 47. Moreover, the carriers all slide within box-like channels molded onto an interior surface of cover 81. Therefore, the switches are substantially trapped for movement between a first or rearward face 635 of circuit board 47 and a first internal face 637 of cover 81. Extension segments 91 and the majority of handle interfacing segment 61 are disposed between a second or opposite forward face 639 of circuit board 47 and face 641 of body 77.

Figure 21:
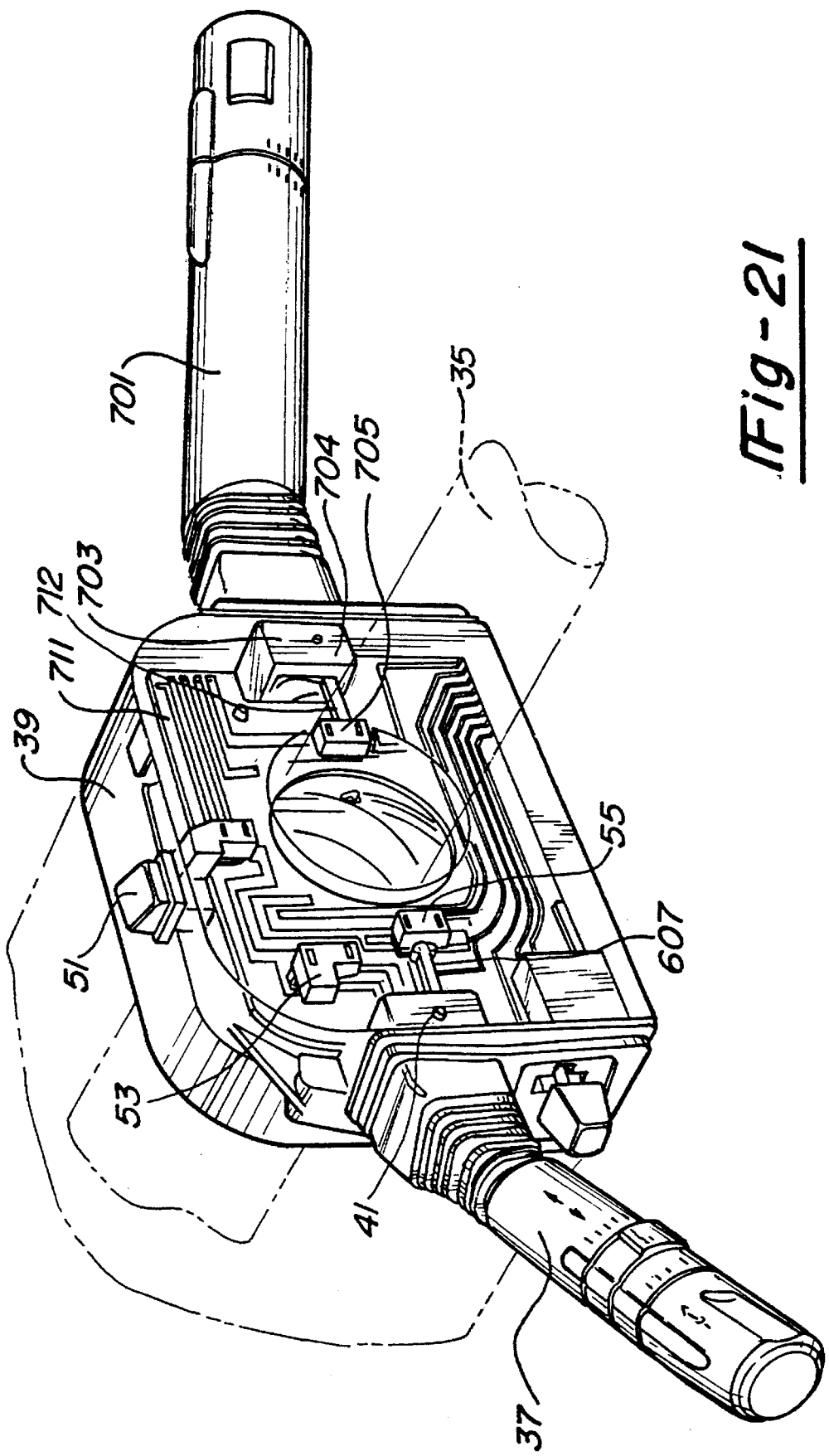
FIG. 21 is an elevational view, similar to that of FIG. 1, showing an alternate embodiment of the present invention turn signal cancellation mechanism.

An alternate embodiment construction of the present invention turn signal cancellation mechanism is shown in FIG. 21. In this embodiment, a second stalk or handle 701 is pivotally attached to the identically same housing 39 through a second actuator 703 by way of a handle interfacing segment 704. This second handle 701 serves to slide a set of switches 705, similar to those preferably disclosed hereinabove in conjunction with a full size rigid printed circuit board 711 through a switch actuating segment 712. Circuit board 711 also has provisions for turn signal, dimming and hazard switching functions. A close out bezel 713 (see FIG. 4) is deleted for placement of second handle 701. Thus, a modularized turn signal cancellation mechanism is provided within a common housing, and with many of the same components, which can interchangeability retain and operate a multitude of different handle and switching configurations and functions.

The detailed structure of steering column tilt switch 57 is shown in FIG. 4. Steering column tilt switch 57 is a four way switch which electrically causes tilting of the steering column along one axis and in/out telescoping of the steering column along the other axis. Steering column tilt switch 57 is constructed from a tilt button 801, cover 803, actuator 805, return spring 807, tilt plunger 809, compression spring 811, carrier 813, electrical contactor 815, printed circuit board 817 and housing 819. Printed circuit board 817 has an 820 ohm resistor, 330 ohm resistor, 1.5 k ohm resistor, 2.2 k ohm resistor and a two-way header mounted thereon. Button 801 is secured upon a post extending from actuator 805 which protrudes through the slotted passageway within cover 803. Four pivot posts transversely extending from a bottom of actuator 805 engage with mating cradles disposed in side walls of carrier 813. Compression spring 811 acts to center actuator 805. Tilt plunger 809 is spring biased within the bottom of actuator 805 and selectively causes contactor 815 to operate the associated electronic components on printed circuit board 817.

Referring now to FIGS. 1 and 4, handle 37 has a set of intermittent windshield wiper and windshield washer switches 901. Wiper and washer switches 901 are comprised of a wash button 903, a wash return spring 905, a knob case 907, a wash/wipe contactor 909, a functional printed circuit board 911, a function ring 913, a function detent spring 915, detent fingers 917, a handle screw 919, an interval detent spring 921, an interval ring 923, an interval contactor 925, an interval printed circuit board 927 and a sleeve 929. These components are mounted upon a rigid shaft 931 which extends through an elastomeric, accordion style boot 933 and an opening within a polymeric bezel 935 for engagement within a branch 937 extending from handle hub 65. Each function printed circuit board 911 further includes a 3.3 k ohm resistor, 47.5 k ohm resistor, 11 k ohm resistor, 4.02 k ohm resistor and two two-way headers. Interval printed circuit board 927 has a 100 k ohm resistor, 82 k ohm resistor, 68 k ohm resistor, 51 k ohm resistor, 36 k ohm resistor, 20 k ohm resistor, 3.3 k ohm resistor and a two-way header.

Function ring 913 and sleeve 929 are rotatably fixed in relation to shaft 931. Function printed circuit boards and interval printed circuit board, respectively 911 and 927, are rotatably fixed as well. Knob case 907 is rotatable between a spring biased mist position, a detented off position, a detented intermittent wipe position, a low detented wipe position and a high detented wipe position. Wash/wipe contactor rotates therewith. Knob case 907 is biased to return to the off position from the mist position. Additionally, interval ring 923 is rotatable about shaft 931 between seven differently timed intermittent wipe positions. Depression of wash button 903 serves to depress wash/wipe contactor 909 against the function printed circuit board 911.

Handle 37 can further be pulled rearward (i.e., toward the vehicle driver) to activate dimmer switch 53.

Figure 19:
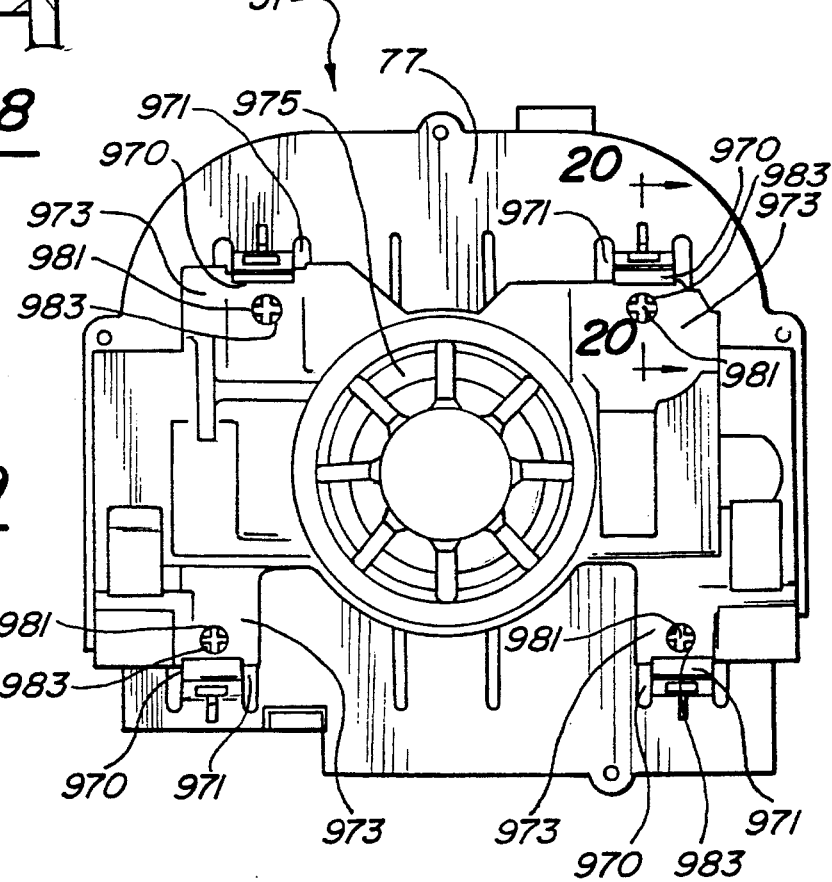
FIG. 19 is an elevational view, opposite that of FIG. 1 showing the preferred embodiment turn signal cancellation mechanism of the present invention fastened to a bearing housing.
Figure 20:
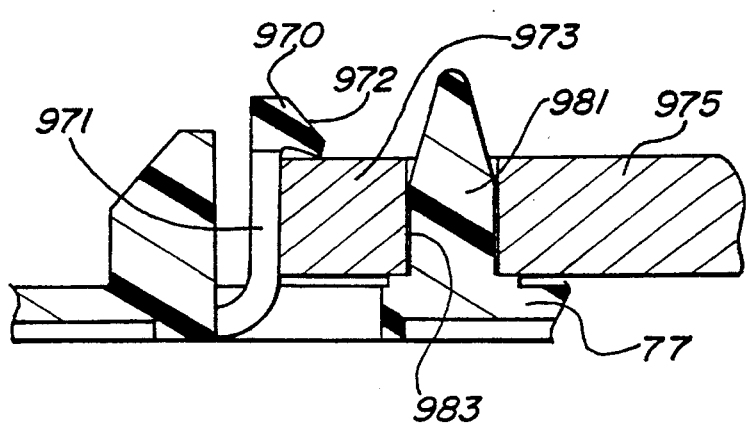
FIG. 20 is an enlarged cross sectional view, taken along line 20—20 of FIG. 19, showing the preferred embodiment turn signal cancellation mechanism of the present invention fastened to the bearing housing.

Turn signal cancellation mechanism 31 is retained to steering column 33 as is shown in FIGS. 19 and 20. Four snap fit attachments 970 project from body 77. Each snap fit attachment 970 is constructed from a flexible lever arm 971 with a barb 972 mounted on a distal end thereof. These barbs 972 engage with a set of flanges 973 which transversely extend from a cast aluminum bearing housing 975. Bearing housing 975 retains a bearing race which journally supports the rearmost portion of steering shaft 35. A set of tapered alignment pins 981 also project forward from body 77 of turn signal cancellation mechanism 31. These alignment pins 981 engage with a matching set of orifices 983 within bearing housing 975. Therefore, turn signal cancellation mechanism 31 can be easily and quickly secured to the steering column in a tool free manner without screws.

While the preferred embodiment of this turn signal cancellation mechanism has been disclosed, it will be appreciated that various modifications may be made without departing from the present invention. For example, the plunger, modified T-shaped slot, circuit boards, pawl and switch designs may be employed with actuators having differing shapes and even with those that are mounted solely on one side of the steering shaft. Furthermore, multiple printed circuit boards may be employed within the single modularized common housing. Alternate turn signal detent configurations and plunger types may be used in combination with the presently disclosed actuator. Moreover, the arm of the pawl may point substantially perpendicular to the handle. Rotating, rather than linearly sliding, switches may also be used with the presently disclosed turn signal circuit board. Differing cancel cam shapes can replace that disclosed herein. Various materials, dimensions and resistor types have been disclosed in an exemplary fashion, however, other materials, dimensions and resistor types may of course be employed. It is intended by the following claims to cover these and any other departures from the disclosed embodiments which fall within the true spirit of this invention.

The invention claimed is:

1. A turn signal cancellation mechanism comprising:

an actuator having a handle interfacing segment, said actuator selectively movable between a left turn position, a neutral position and a right turn position; and a pawl having a single cancel cam engaging arm extending toward said handle interfacing segment of said actuator, said pawl movable in response to said actuator.

2. The turn signal cancellation mechanism of claim 1 further comprising:

an engagement segment of said actuator having an engagement wall with an aperture therethrough; and a post extending from said pawl substantially perpendicular to a longitudinal direction of said arm, said post of said pawl engaging with said aperture of said engagement wall, said pawl operably movable in at least two different directions in relation to said engagement segment.

3. The turn signal cancellation mechanism of claim 2 wherein:

said aperture is defined as a modified T-shaped slot having a pair of upper channels and a center leg;

said post of said pawl is located within said center leg of said slot when said actuator is in said neutral position;

said post of said pawl is located in one of said upper channels of said slot when said actuator is in said left turn position; and said post of said pawl is located in the other of said upper channels of said slot when actuator is in said right turn position.

4. The turn signal cancellation mechanism of claim 3 wherein:

said arm of said pawl is disposed in a retracted position when said actuator is in said neutral position; and said arm of said pawl is disposed in an extended position when said actuator is in said right and left turn positions.

5. The turn signal cancellation mechanism of claim 4 further comprising a housing having an elongated slot within which said post of said pawl slidably engages for linear movement.

6. The turn signal cancellation mechanism of claim 2 further comprising:

a base of said pawl having said arm longitudinally extending therefrom, said base further having a transverse dimension greater than twice that of said arm, said post projecting from said base; and biasing means engaging with a channel transversely disposed across said base.

7. The turn signal cancellation mechanism of claim 6 wherein said arm of said pawl is movable in relation to said base, said arm has an elongated slot therein for engagement with said post extending from said base.

8. The turn signal cancellation mechanism of claim 2 further comprising a pair of extension segments of said actuator directly coupling said engagement segment with said handle interfacing segment, said pair of extension segments being spaced apart from each other.

9. The turn signal cancellation mechanism of claim 8 further comprising:

an internal surface of said actuator defined by said handle interfacing segment, said pair of extension segments, and said engagement segment; and said internal surface of said actuator having a substantially elongated annular shape for surrounding a passageway through which a steering shaft and cancel cam extends.

10. The turn signal cancellation mechanism of claim 1 further comprising:

a housing having a passageway for radially surrounding a steering shaft and cancel cam therein; and said pawl is disposed on a radially opposite side of said passageway from said handle interfacing segment, both of which are substantially disposed within said housing.

11. The turn signal cancellation mechanism of claim 10 wherein said handle interfacing segment is pivotably coupled to said housing such that slight pivotable movement thereof causes relatively greater pivotal movement of an engagement wall of said actuator which directly engages with said pawl.

12. The turn signal cancellation mechanism of claim 1 wherein said actuator is movable for detented engagement into one of said turn positions even when said arm of said pawl is directly in line with a lobe of a cancel cam.

13. A turn signal cancellation mechanism comprising:

an actuator having a handle interfacing segment, said actuator selectively movable between a left turn position, a neutral position, and a right turn position; and a pawl having a cancel cam engaging arm extending toward said handle interfacing segment of said actuator, said pawl movable in response to said actuator, said arm linearly moved toward said handle interfacing segment when disposed in said left and right turn positions, said arm further linearly retracted away from said handle interfacing segment when disposed in said neutral position.

14. The turn signal cancellation mechanism of claim 13 further comprising:

an engagement segment of said actuator having an engagement wall with an aperture therethrough; and a post extending from said pawl substantially perpendicular to a longitudinal direction of said arm, said post of said pawl engaging with said aperture of said engagement wall, said pawl operably movable in at least two different directions in relation to said engagement segment.

15. The turn signal cancellation mechanism of claim 14 further comprising:

a base of said pawl having said arm longitudinally extending therefrom, said base further having a transverse dimension greater than twice that of said arm, said post projecting from said base; and biasing means engaging with a channel transversely disposed across said base.

16. The turn signal cancellation mechanism of claim 15 wherein said arm of said pawl is movable in relation to said base, said arm has an elongated slot therein for engagement with said post extending from said base.

17. The turn signal cancellation mechanism of claim 14 wherein:

said aperture is defined as a modified T-shaped slot having a pair of upper channels and a center leg;

said post of said pawl is located within said center leg of said slot when said actuator is in said neutral position;

said post of said pawl is located in one of said upper channels of said slot when said actuator is in said left turn position; and said post of said pawl is located in the other of said upper channels of said slot when said actuator is in said right turn position.

18. The turn signal cancellation mechanism of claim 14 further comprising a housing having an elongated slot within which said post of said pawl slidably engages for linear movement therealong.

19. The turn signal cancellation mechanism of claim 14 further comprising a pair of extension segments of said actuator directly coupling said engagement segment with said handle interfacing segment, said pair of extension segments being spaced apart from each other.

20. The turn signal cancellation mechanism of claim 19 further comprising:

an internal surface of said actuator defined by said handle interfacing segment, said pair of extension segments, and said engagement segment; and said internal surface of said actuator having a substantially elongated annular shape for surrounding a passageway through which a steering shaft and cancel cam extends.

21. The turn signal cancellation mechanism of claim 13 further comprising:

a housing having a passageway for radially surrounding a steering shaft and cancel cam; and said pawl is disposed on a radially opposite side of said passageway from said handle interfacing segment, both of which are substantially disposed within said housing.

22. The turn signal cancellation mechanism of claim 21 wherein said handle interfacing segment is pivotably coupled to said housing such that slight pivotable movement of said handle interfacing segment causes relatively greater pivotal movement of an engagement wall of said actuator which directly engages with said pawl.

23. A turn signal cancellation mechanism comprising:

a pawl having a post projecting therefrom; and an actuator having a handle interfacing segment and an engagement segment, said engagement segment having an engagement wall with a modified T-shaped slot disposed therein, said post of said pawl movably engaging with said modified T-shaped slot.

24. The turn signal cancellation mechanism of claim 23 wherein:

said modified T-shaped slot has a pair of arcuate upper channels and a center V-shaped leg;

said post of said pawl is located within said center V-shaped leg of said slot when said actuator is in said neutral position;

said post of said pawl is located in one of said upper channels of said slot when said actuator is in said left turn position; and said post of said pawl is located in the other of said upper channels of said slot when said actuator is in said right turn position.

25. The turn signal cancellation mechanism of claim 24 further comprising:

an arm of said pawl disposed in a retracted position when said actuator is in said neutral position; and said arm of said pawl disposed in an extended position when said actuator is in said right and left turn positions.

26. The turn signal cancellation mechanism of claim 25 further comprising a housing having an elongated slot within which said post of said pawl slidably engages for linear movement.

27. The turn signal cancellation mechanism of claim 23 further comprising:

a base of said pawl having said arm longitudinally extending therefrom, said base further having a transverse dimension greater than twice that of an arm, said post projecting from said base; and biasing means engaging with a channel transversely disposed across said base.

28. The turn signal cancellation mechanism of claim 27 wherein said arm of said pawl is movable in relation to said base, said arm has an elongated slot for engagement with said post extending from said base.

29. The turn signal cancellation mechanism of claim 23 further comprising:

a housing having a passageway for radially surrounding a steering shaft and cancel cam; and said pawl is disposed on a radially opposite side of said passageway from said handle interfacing segment, both of which are substantially disposed within said housing.

30. The turn signal cancellation mechanism of claim 29 wherein said handle interfacing segment is pivotably coupled to said housing such that slight pivotable movement of said handle interfacing segment causes relatively greater pivotal movement of said engagement wall of said actuator which directly engages with said pawl.

31. A pawl for use in a turn signal cancellation mechanism comprising:

a base;

an arm longitudinally extending from said base, said base further having a transverse dimension greater than twice that of said arm;

a post oriented substantially perpendicular to said arm;

a channel transversely disposed across said base behind said arm and said post.

32. The pawl of claim 31 further comprising a cancel cam interfacing section of said pawl mounted on a distal end of said arm and being thicker than a nominal elongated section of said arm, said cancel cam interfacing section having a tapered foot pointing toward said post.

33. The pawl of claim 32 further comprising a head of said cancel cam interfacing section having a taper pointing away from said post.

34. The pawl of claim 31 wherein said post of said pawl has a cylindrically shaped section and a relatively larger stepped section closest to a nominal section of said arm.

35. The pawl of claim 31 wherein said arm of said pawl is movable in relation to said base, said arm has an elongated slot therein for engagement with said post extending from said base.

36. A pawl for use in a turn signal cancellation mechanism comprising:

a base;

an arm longitudinally extending from said base, said base further having a transverse dimension greater than twice that of said arm;

a post oriented substantially perpendicular to said arm;

a channel located on said base on the same surface having said post upwardly extending therefrom.

37. The pawl of claim 36 further comprising:

a head of said arm having a taper pointing toward said post; and said post of said pawl having a cylindrically shaped section and a relatively larger stepped section closest to a nominal section of said arm.

38. A turn signal cancellation mechanism comprising:

a housing;

an actuator positioned within said housing and pivotably mounted thereto, said actuator having a handle interfacing segment and a plunger supporting structure;

a plunger having an elongated shaft and a partially spherical cap integrally formed on a distal end of said plunger, said shaft having a substantially polygonal cross sectional shape along a nominal portion of said shaft, said shaft linearly slidable within said plunger supporting structure of said actuator;

a spring interfacing with said plunger supporting structure of said actuator for biasing said plunger toward an outwardly extended position; and a detent structure having a ledge with a neutral position valley and adjacent turn position peaks, said cap of said plunger riding along said ledge of said detent structure to provide detenting action.

39. The turn signal cancellation mechanism of claim 38 wherein said plunger is entirely injection molded from a lubricous engineering grade polymeric material.

40. The turn signal cancellation mechanism of claim 38 wherein said cross sectional shape of said plunger is further defined as square.

41. The turn signal cancellation mechanism of claim 38 wherein said handle interfacing segment is pivotably coupled to said housing such that slight pivotable movement of said handle interfacing segment causes relatively greater pivotal movement of said plunger supporting structure of said actuator.

42. The turn signal cancellation mechanism of claim 38 further comprising a finger perpendicularly projecting from said shaft of said plunger.

43. An apparatus comprising:
a turn signal cancellation mechanism having a plurality of snap fits extending from a first housing, each of said plurality of snap fits defined by a lever arm and a barb adjacent a distal end thereof; and
a second housing operable for supporting a steering shaft, said second housing having a plurality of flanges engagable by said plurality of snap fits of said turn signal cancellation mechanism;
whereby said turn signal cancellation mechanism is affixed upon said second housing in a screw-free and tool-free manner.

44. The apparatus of claim 43 wherein said plurality of snap fits supplies the sole means for attaching said turn signal cancellation mechanism to said second housing.

45. The apparatus of claim 43 wherein said housing of said turn signal cancellation mechanism has a passageway extending therethrough such that said housing radially surrounds a longitudinally adjacent portion of said steering shaft.

46. A turn signal cancellation mechanism comprising:
a housing;
a first actuator having a handle interfacing segment, said actuator movable between left turn, right turn, and neutral positions;
a switch having an electrically conductive contactor, said switch movably coupled to said first actuator; and
a circuit board having a substrate with a plurality of electric current carrying paths thereon, said circuit board disposed within said housing, said contactor of said switch selectively interfacing with at least two of said plurality of electric current carrying paths of said circuit board.

47. The turn signal cancellation mechanism of claim 46 wherein:
said switch is disposed between a first face of said circuit board and a first internal face of said housing, said first internal face of said housing having a plane substantially parallel to a plane of said circuit board; and
a portion of said first actuator is disposed between a second face of said circuit board and a second internal face of said housing, said second internal face of said housing having a plane substantially parallel to said plane of said circuit board.

48. The turn signal cancellation mechanism of claim 46 further comprising:
a second actuator movably disposed within said housing, said second actuator having a handle interfacing segment and a switch actuating segment; and
a second electrical switch movably coupled to said switch actuating segment of said second actuator, said second switch selectively interfacing with at least two of said plurality of electric current carrying paths of said circuit board.

49. The turn signal cancellation mechanism of claim 46 further comprising a carrier of said switch slidable against an internal face of said housing such that said switch is movably trapped between said housing and said circuit board.

50. A turn signal cancellation mechanism comprising a common housing suitable for interchangeability retaining differing circuit board shapes, differing movable switch combinations, and differing combinations of at least one pivoting actuator with a handle extending therefrom.

* * * * *